May 17, 1966 R. N. FOSTER 3,251,548
ZONE CONTROL FOR AIR HEATING, COOLING AND VENTILATING SYSTEMS
Filed April 23, 1963 3 Sheets-Sheet 1
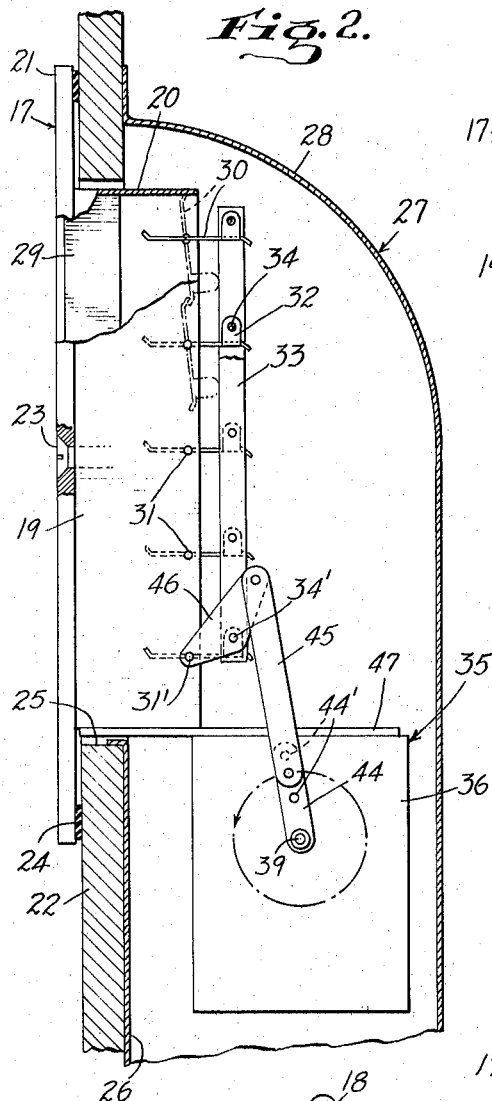
INVENTOR.
RICHARD N. FOSTER
BY
Howard P. Thompson
ATTORNEY

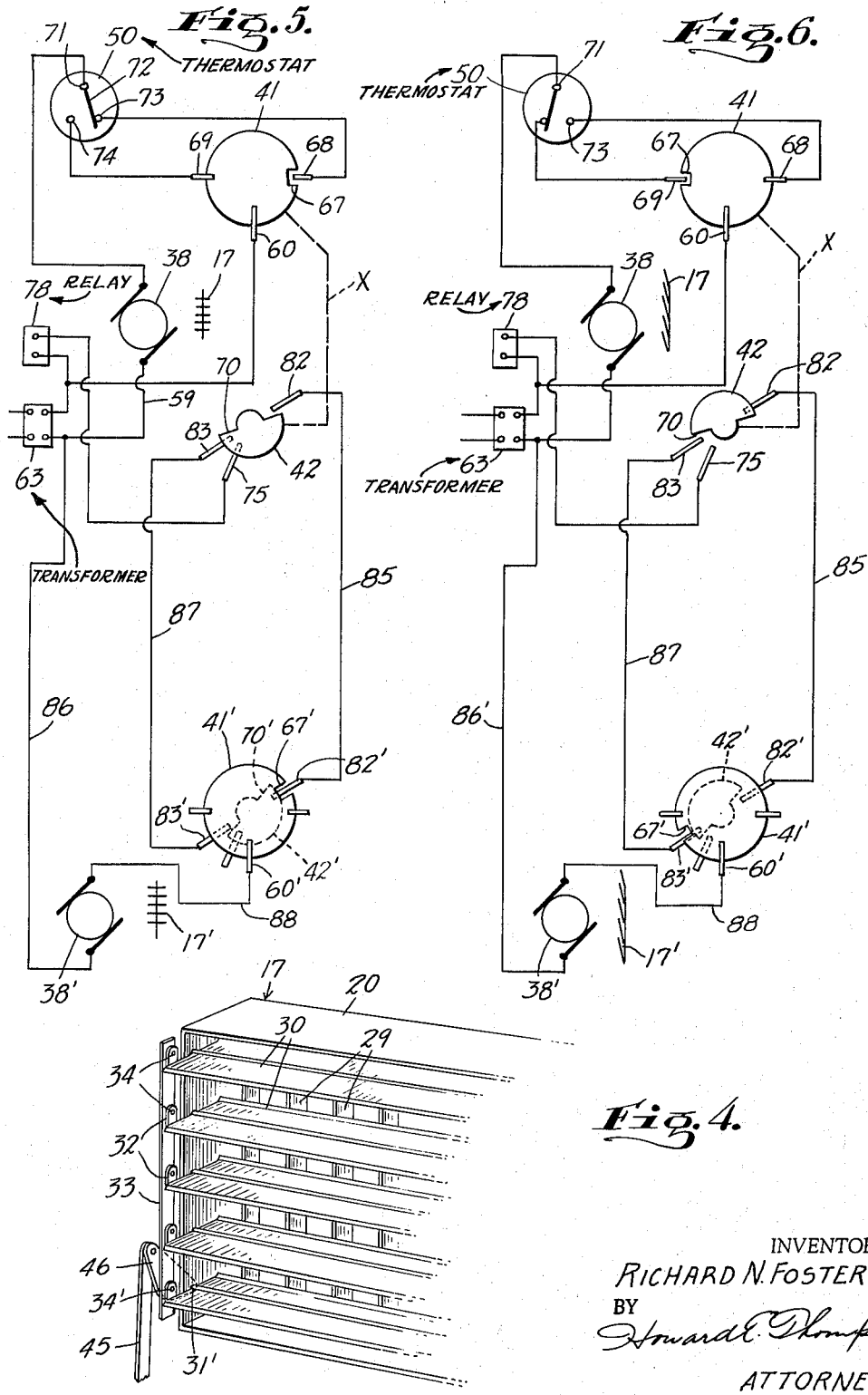

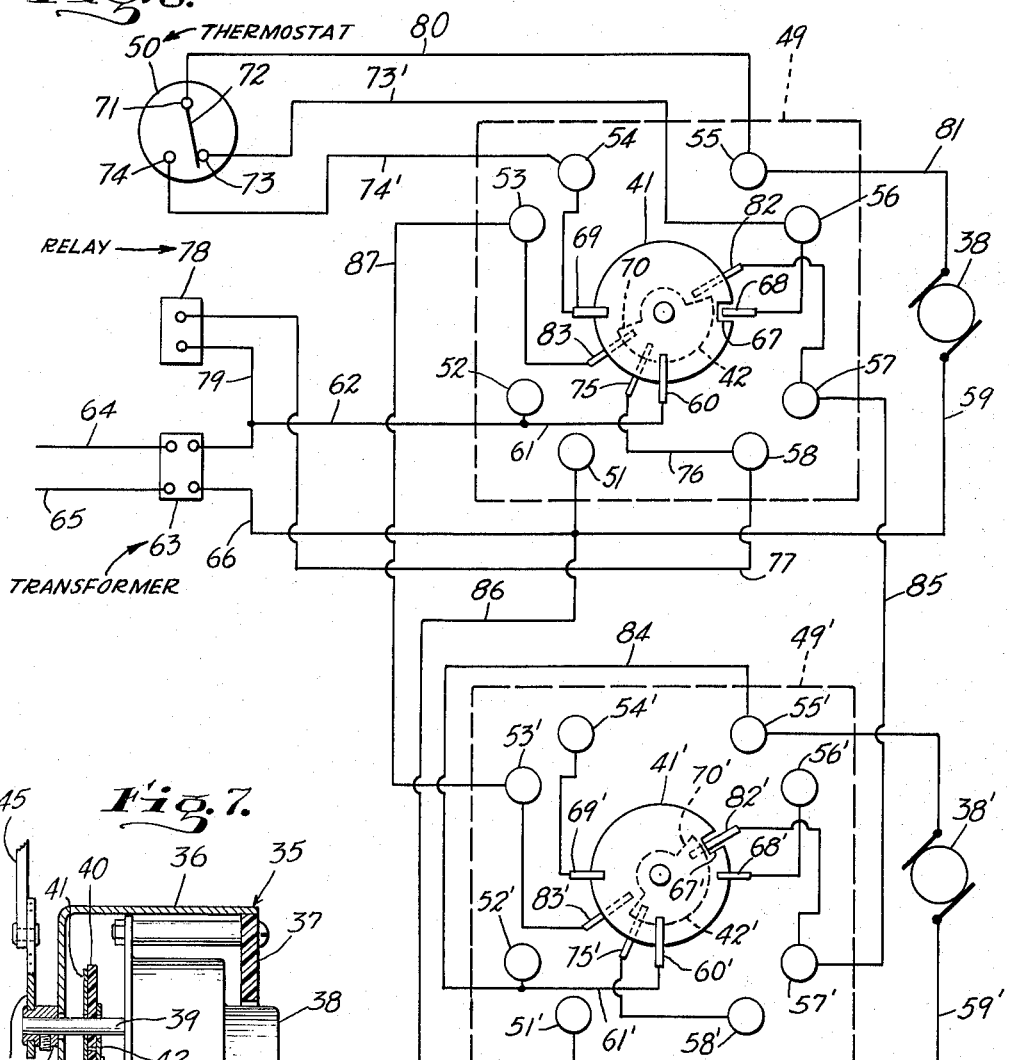
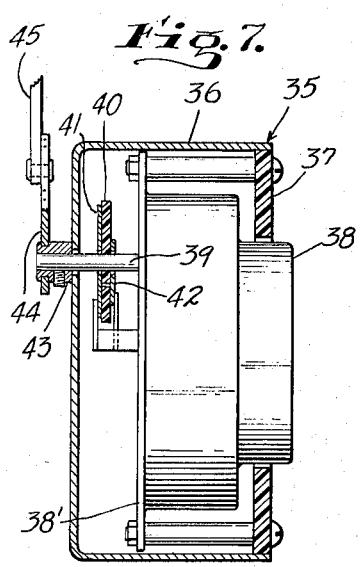

United States Patent Office 3,251,548
Patented May 17, 1966

3,251,548
ZONE CONTROL FOR AIR HEATING, COOLING AND VENTILATING SYSTEMS
Richard N. Foster, 160 Rock Hill Road, Clifton, N.J.
Filed Apr. 23, 1963, Ser. No. 275,028
7 Claims. (Cl. 236—1)

This invention relates to devices or apparatus adapted to be installed in ducts of various types and kinds in providing a room or zone control of temperatures, or what might be termed generally air conditioning, in a complete system and, particularly, wherein means is provided for automatic control of at least predetermined devices or apparatus in a complete system. More particularly, the invention deals with a device or apparatus of the character defined, comprising a preassembled unit, with means facilitating assemblage of parts of the unit in such manner as to adapt the same for mounting in various types and kinds of ducts, thereby producing an extremely economical unit, resulting in a material reduction in cost in installing the number of units required in a given system installation.

Still more particularly, the invention deals in units of the type and kind under consideration, wherein more or less standard types of registers can be utilized and converted into automatic control units of the type and kind defined.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic view showing at least part of an installation in a system and illustrating four of my improved registers and designating the thermostatic control therefore by the circles with the letter T therein.

FIG. 2 is an enlarged section view of an installed unit showing an assemblage of the unit for one type of duct showing the louvers of the register in open position and indicating, in part, two of the louvers in closed position in dot-dash lines, part of the construction of the unit being broken away and in section.

FIG. 3 is a view, generally similar to FIG. 2, showing assemblage of the unit in adapting the same to a different type and kind of duct.

FIG. 4 is a rear perspective view of the casing portion of the register of a unit and illustrating one side only thereof, with the parts in the position shown in full lines in FIG. 2.

FIG. 5 is a diagrammatic view of the wiring diagram and illustrating the switch plates of a master actuator or unit in spaced relationship to each other and the switch plates of an associated actuator arranged in their general assembled relationship and diagrammatically illustrating the register in open position.

FIG. 6 is a view, similar to FIG. 5, showing the closed position of the switches and also diagrammatically illustrating the registers in closed position.

FIG. 7 is a diagrammatic sectional view through the casing of one of the switch actuating devices which I employ to generally portray arrangement of the components and omitting all wiring for sake of clarity; and FIG. 8 is another diagrammatic wiring diagram with the various components in the relationship of FIG. 5, but illustrating the switch plates as they are disposed one above the other and diagrammatically illustrating the terminals on the switch actuating devices, these devices being outlined in FIG. 8 in long dotted lines.

In FIG. 1 of the drawing, I have shown a part of an installation of a system in accordance with my invention and, in said figure, 10 represents a furnace or combination furnace and air conditioning unit, from which extend primary circulating ducts 11 and 12, part only of the duct 11 being shown. Extending from the duct 12 are branch circulating ducts 13, 14, 15 and 16, which extend to different rooms of any type and kind of structure and, by way of illustration, could be the rooms of a private home. The ducts 13–16 terminate in upstanding portions, as diagrammatically illustrated, in which my improved control units are mounted, as diagrammatically illustrated at 17, and at 18 is diagrammatically illustrated the control thermostats, which will be suitably positioned in each room. At this time, it will be understood that some rooms may have several discharge ducts, particularly large rooms requiring a greater supply of the heated or cooled air and in such other duct or ducts will be mounted supplemental units, the circuitry to one of which is referred to in FIGS. 5, 6 and 8 of the drawing.

Turning now to the showing in FIGS. 2 and 3 of the drawing, I have shown in somewhat detail two different installations of the units 17; whereas, in FIG. 4, I have illustrated, in perspective, one side portion of a unit 17, as viewed in FIG. 2 of the drawing. Each unit comprises a suitable register 19, which can be of a standard construction, the unit comprising an oblong rectangular register casing 20, having a flanged front 21 extending about the periphery of the casing 20, with means at sides of the flange for mounting the unit on the support or wall 22 of a room, the means being screws, one of which is indicated, in part, at 23 in FIG. 2 of the drawing. The inner surface of the flange 21 preferably includes a rubber sealing gasket 24. The wall 22 has an aperture 25 therein for reception of the casing 20 and secured to the inner surface of the wall 22 is a vertical portion 26 of a duct 27, the upper end of which is rounded, as seen at 28. The casing 20 has, at its outer end, vertically disposed louvers 29 arranged at the outer open end of the casing. Pivotally supported at the inner open end of the casing on the side walls thereof are louvers or dampers 30, the pivotal supports 31 extending through the side walls of the casing. The inner portions of the louvers 30, when in their open position as illustrated in full lines in FIG. 2 of the drawing, have angularly disposed lugs 32, with which are pivoted strips 33, these pivots being illustrated at 34, so that all of the louvers 30 will be simultaneously actuated. The strips 33 are disposed at both ends of the louvers, so that my improved actuators, one of which is illustrated at 35 in FIG. 2, can be mounted at either side of the casing 20. The assemblage of the actuator 35 is diagrammatically illustrated, in part, in FIG. 7, with the omission of all wiring and terminals. Considering FIG. 7, it will appear that the actuator comprises a cup-shaped casing 36, the open end of which is closed by an insulation plate 37, upon which the motor unit 38 is mounted. The shaft output of the unit 38 is illustrated at 39 and suitably mounted on this shaft is what is generally referred to as a wafer or dual switch 40 having, at sides thereof, switch plates 41 and 42 in circuit with each other. The shaft 39 projects through the casing 36 and fixed thereto is a collar 43. Suitable screws, not shown, engage the flange portion 38' in maintaining the assemblage. Upon removing these screws and uncoupling the collar 43, the entire assemblage 38, 40, including the shaft 39, can be removed from the casing 36. Fixed to the collar 43 is a crank arm or drive element 44, with which is adjustably coupled a link 45. In other words, the crank arm 44 has spaced apertures, as at 44', FIG. 2, to provide this adjustment. Pivoted to the free end portion of the link 45 is an operating lever 46, as diagrammatically seen in FIG. 2 of the drawing, this lever being pivotally mounted on one of the pivots 34, as indicated at 34' in FIG. 2, the free end of the lever 46 having a pivotal mounting on one of the pivotal supports 31, as indicated at 31' in FIG. 2.

In FIG. 2, the unit assemblage is illustrated with the louvers 30 in open position, the upper louvers only in said figure being illustrated in closed position in dot-dash lines, which would be a stop position at 180° from the showing of the crank arm 44 in said figure, and which will be clear from the description of the circuit and operation of each unit, as hereinafter set forth.

In the installation, as shown in FIG. 2 of the drawing, a metal mounting strap 47 is suitably fixed to the upper surface of the casing 36 and to the lower surface of the casing 20. In contrast to this mounting, I have shown in FIG. 3 of the drawing the casing 36 supported upon a strap 47' fixed to the lower surface of the casing 20, instead of being hung from the strap 47. This is done to adapt the same unit, as shown in FIG. 2 of the drawing, for mounting in a duct 48, which extends inwardly from the wall 22', which is otherwise similar to the wall 22, so that, in both types of installations, the completely preassembled unit can be readily inserted in the respective ducts and fixed to the wall, from which the ducts extend. With the showing in FIG. 3 of the drawing, it will be apparent that the lever 46 is mounted on a higher pivot 34'' and coupled with a pivotal support 31'' on a higher louver, but otherwise the unit will function in the same manner, as the unit shown in FIG. 2 of the drawing in movement of the louvers into the open and closed positions.

Considering FIG. 8 of the drawing, I have outlined in dotted lines at 49 what could be the casing 36 or the periphery of the insulated cover 37 of what will be referred to as the master accelerator unit and at 49' is a similar showing of what can be referred to as a supplemental accelerator which automatically works off from a single thermostat control 50 governing the master accelerator. This illustration is to indicate, at least in part, that a single thermostat in a room can control operation of one or more supplemental actuators, each including register units, generally similar to the unit 17, except for the wiring employed in the supplemental unit or units. In the diagrammatic showing of FIG. 1 of the drawing, the thermostats 50 are indicated by the reference numeral 18 and, in this showing, master accelerator units only are shown.

Considering specifically FIG. 8, with a further reference to FIGS. 5 and 6, the circuit will be understood from the following description. In FIG. 8, 51–58, inclusive, represent terminals on the outer surface of 37, with which circuit wires from the interior of the casing 36 and extending from the actuator are coupled and in the supplemental actuator, shown at 40' in FIG. 8, these terminals are designated by the reference characters 51'–58'. The terminal 51 is connected directly to the motor 38 and could constitute the ground leg of the circuit, as indicated by the wire 59. The terminal 52 is connected to a contact 60, which constitutes a power source of supply to the plate 41 of the wafer switch and, in like manner, to the switch plate 42 in contact therewith and illustrated by the dotted line X in FIGS. 5 and 6. This connection is represented by the circuit wire 61 and extending from the terminal 52 of the master actuator is a wire 62 which extends to a transformer 63, to which the circuit wires from a source of electrical supply are coupled, as indicated at 64 and 65; whereas, the output through the transformer in the wire 62 and the wire 66 extending to the terminal 51 is of a reduced voltage, namely twenty-four volts, sixty cycle, for actuation of the motor 58. The switch plate 41 has a notch 67 therein to break circuit to contacts 68 and 69 in controlling operation of the unit 17, as later described.

The switch plate 42 has a semi-circular contact edge portion 70 in controlling actuation of the circuit. The thermostat 50, which controls the operation of the actuator 35, has a post 71 and a switch arm 72 operatively engaging terminals 73 and 74 and, in the showing of FIG. 8 of the drawing, the switch 72 is in engagement with the terminal 73 in satisfying the demand for movement of the louvers into the open position, as illustrated in FIGS. 2 and 3 of the drawing and diagrammatically noted in the units 17 of FIG. 5 of the drawing. In other words, during the cycle of operation, the end of which is noted in FIGS. 5 and 8, the wafer switch 40 has been rotated by the motor 38 180°, until the notch 67 registers with the contact 68, which results in breaking the circuit to the motor 38 and stopping the motor after completing a half revolution or substantially 180° of travel.

In the aforesaid operation, the switch plate 42 is also rotated, which places this plate in operative engagement with a contact 75, which results in closing a circuit through wire 76 to terminal 58 and from this terminal through wire 77 to the relay 78 on a furnace or other source of heat or cold air supply, the other side of the circuit to the relay 78 being through the wire 79, which extends to the other side of the transfer, as diagrammatically illustrated. The wire 79 has connections with terminal 52, as indicated at 62.

From the foregoing, it will be apparent that the circuitry to the relay is closed, which would result in putting the furnace, as at 10 FIG. 1, into operation and move the louvers into the open position shown in FIGS. 2 and 3 for a continued supply of hot or cold air, until such time as the further demand for this supply has been satisfied; whereupon, the switch 72 will automatically move into operative engagement with the contact 74. This operation will now complete a circuit through wire 80 to the terminal 55 and to the motor 38 through wire 81 from the motor through wire 59 to the transformer and from the transformer through wire 62 to contact 60, and plate 41, contact 69, terminal 54 and wire 74' to the contact 74, thus putting the motor 38 into operation, which causes the wafer switch 40 to rotate, moving the plates 41, 42 from the position shown in FIGS. 5 and 8 to the position shown in FIG. 6, at the completion of which, the wafer switch has traveled 180° with the notch 67 in registration with the contact 69.

In the aforesaid operation, it will be apparent that circuit through the contact 75 has been broken by virtue of the position of the switch plate 42, noted in FIG. 6, which automatically breaks the circuit to the relay to shut-off or stop the furnace or other sources of supply, as will be apparent from tracing the circuit in FIG. 6. The foregoing results in moving the louvers, as at 30 FIG. 2, from the open position to the closed position, as diagrammatically illustrated at 17 in FIG. 6.

The foregoing may be said to define one complete cycle of operation of the unit 17, from the standpoint of supplying the desired discharge through the unit 17 with the louvers 30 in their open position, as shown in FIG. 2, to the position where the louvers have been moved into the closed position, as illustrated, in part, in dot-dash lines in FIG. 2, and this cycle of operation will be repeated as and when there is a demand for more hot or cold air or the requirement for shutting-off this supply, which is controlled through actuation of the thermostat in the room in which the particular unit is mounted in at least one of the ducts leading to such room.

However, where it is essential to supply additional source of hot or cold air to a room by virtue of its size or particular location, supplemental units can be employed in other ducts and, in diagrammatically illustrating one adaptation of such supplemental supplies, I have diagrammatically illustrated in FIGS. 5, 6 and 8 one of such supplemental units. From the standpoint of simplicity, the actuators in each unit would be of the same general construction; in other words, one type of device would be made and the only change in the supplemental unit or units would be the type of wiring employed tying up the supplemental unit with the master unit or actuator which has been above described in detail, with the exception of the circuitry to the supplemental unit, it being understood, in this connection, that the supplemental unit or units have no electrical hook-up with a thermostat, as the single thermostat of the room which is being controlled will operate through the master actuator or unit, as will be apparent.

For simplification, common components in the supplemental actuator, in addition to the terminals 51'-58', will have primed reference characters as, for example, at 38", 41', 42', 59', 60', 61', 67', 68', 69', 70' and 75'. In this connection, it will be understood that, insofar as the functioning of the circuit of the supplemental actuator is concerned, components 68', 69', and 75' perform no function and, at this time, it should be clearly borne in mind that operation of the supplemental accelerator, or accelerators, takes place slightly after functioning of the master or primary actuator and, in the diagrammatic showings of the circuitry in FIGS. 5, 6 and 8, the switch plates 41 and 42 are shown in the position after the completion of operation of each of the master accelerators.

The bottom switch plate 42 is also used to engage bottom switch terminals 82, 82'; 83, 83' which are provided to control the opening and closing of one or more actuators which may be required to control the flow of air to the same room or zone through other outlets which must open and close on the same thermostat demand and satisfied cycle. When more than one automatic air outlet is provided in a zone, the master actuator is controlled by the thermostat 50, as shown and described above, and serves as a master actuator. Additional automatic air valve supplying air to the same zone are controlled as supplemental actuators by the master actuator. In this application, the operation and cycling of the supplemental actuator motor 38" is controlled by the switch contacts 82, 82'; 83, 83', which are engaged by switch plates 42, 42', as in FIGS. 5, 6 and 8 of the drawing, which show these contacts connected by wires 85 and 87. FIG. 8 diagrammatically shows the complete circuitry employed in this application, and shows a jumper wire 84 employed to close the circuit between terminals 52' and 55', which is required to complete the circuit between switch contacts 60' and the motor 38" when the switch plates 41' and 42' are energized. The ground leg to the motor 38" is shown by the wire 86, connecting terminal 51 of the master actuator to terminal 51' of the supplemental actuator which is connected to the motor 38" by wire 59'. FIG. 5 shows the position of the switch plates 42 and 42', when the master actuator and supplemental actuator are in open position, as indicated at 17. As previously described, the master actuator, in turning to open position, rotates the switch plate 42 approximately 180°. This movement causes the switch plate 42 to become engaged with contact 83, which completes the circuit to contact 83' of the supplemental actuator, which closes the circuit to the motor 38" by way of contact 60' and the wire 88. This circuit, being closed, causes the motor 38" of the supplemental actuator to turn, until the circuit is broken by the switch plate 42', becoming disengaged from contact 83', which is the open position for both the supplemental actuator and the master actuator, as is illustrated by the drawing FIG. 5.

It will be noted in FIGS. 5, 6 and 8 that the position of the switch plates 42' and 41' are slightly more advanced on the supplemental actuator as compared to the switch plates 41, 42 on the master actuator, due to the circuit employed to operate the supplemental actuator driving the switch plate 42' to a disengaged position from terminal 83', in order to stop the motor 38" and to position the forward edge 70' of the switch plate 42' in engagement with contact 82', which will now be in position to provide a circuit for the next or closing cycle of the supplemental actuator.

As and when the thermostat 50, as shown in FIG. 5, actuates by movement of the switch arm 72 into engagement with contact 74, the circuit to the master actuator will again be completed, which will cause the master actuator to start and move to the closed position, as previously described and shown in FIG. 6. At the start of this closing movement, the switch plate 42 is in position, as shown in FIG. 5. As the switch plate 42 starts to turn, it will become engaged with contact 82, completing a circuit with contact 82' through the wire 85. The supplemental actuator switch plate 42', being at this time in the position shown in FIG. 5, will complete a circuit to the motor 38" through switch plate 41, contact 60 and wire 88, until the motor has turned approximately 180°, at which time switch plate 42' becomes disengaged from contact 82', as is diagrammatically illustrated in FIG. 6, which is the closed position for both the supplemental actuator and the master actuator, as indicated at 17 and 17'. At this time, it is pointed out that the various diagrammatic illustrations in FIGS. 5, 6 and 8 do not represent the particular period of time between the starting of the operation of the master actuator and the supplemental actuator or actuators.

It will be understood that the wires extending from the several terminals 51-58 of a master actuator or 51'-58' of supplemental actuators can be extended through the ducts to a suitably positioned transformer and the relay usually located on the furnace or other apparatus 10; whereas, the wires, such as 80 and 74' and the wire 73' which extends to the terminal 56 can be passed out through the duct to the position of the thermostat, as located in the room for controlling the master actuator servicing such room or any other arrangement of wiring can be employed to satisfy requirements in any particular location and, in this connection, it will be understood that a single transformer can be used in providing the desired voltage supply to the motors of the several registers employed in any one given installation, here again, consistent with regulations which may prevail in a given locality.

From the foregoing, it will be apparent by way of illustration that the average home having a hot air heating system or a combination of hot and cold air supply can utilize the benefit of my zone control system in economically and efficiently caring for temperature requirements in the various rooms of a home consistent with demands which will be controlled by manual operation of the thermostats in the respective rooms. From actual experience, I have found that a system of this type and kind, in addition to fully satisfying the wants and needs of the occupant, further results in a material saving in the cost of operating the source of heat or cold air supply to the various rooms of the home.

In addition to the foregoing and by reason of the fact that each unit can be preassembled at a factory and quickly and easily installed in a duct outlet and detachable with respect thereto for servicing or other purposes, a material saving results in the cost of installing a system of the type and kind set forth. In other words, with my improved zone control, no operations need be performed on the ducts in assemblage of the units or in support of the units in the duct, here keeping in mind the various types and kinds of ducts which are employed concealed in walls, floors, ceilings and the like. In this connection, it should also be borne in mind that units of the type and kind can employ standard types of registers or what are sometimes termed air valves and, by virtue of this fact, modifying present heating and cooling systems can be accomplished by installation of units of the type and kind defined in the duct outlets extending to various rooms of a home in providing individual room temperature control in such existing systems in providing the more efficient and desirable operation of the system and economy in this operation.

In heating and cooling systems of various homes or the like, invariably, there are rooms, due to location or exposure, in which difficulty is experienced in caring for air conditioning of these rooms from the standpoint of proper heating or from the standpoint of proper cooling, particularly when the rooms in question are exposed to high atmospheric temperatures. The provision of the individual thermostat control in each room operating upon the master unit or actuator and/or two supplemental units or actuators can rectify conditions of this type and kind in providing a predetermined or desired air conditioning in the room in question.

It will be apparent that, in the diagrammatic illustrations of FIGS. 5 and 6, all of the terminals have been omitted for simplicity, the showing in FIG. 8 being deemed sufficient to clearly illustrate one adaptation of the terminals. It will also be apparent that systems of the type and kind under consideration can be installed in any type and kind of building in providing a zone air conditioning control to different rooms of the building.

Having fully described my invention, what I claim as new and desire to secure by Letters Patent is:

1. In air conditioning systems employing a source of air supply and ducts extending from said source to independent rooms of a building, the ducts having discharge openings exposed to said rooms, zone control units insertable into and out of said openings for mounting, in their entirety, in the ducts adjacent said openings, each of said units comprising a casing, means in the casing controlling discharge of air from a duct in which the unit is mounted, each unit including an actuator controlling operation of said means, means projecting from the casing for supporting the actuator in each of two positions, namely one position for use in a horizontal duct and a second position for use in a vertical duct, a motor in said actuator, said actuator having dual switch means operated by said motor, one part of said dual switch means and motor being in circuit with a source of electric supply including a transformer and relay device, one unit of a control zone including a thermostat, said relay device actuated by the other part of said dual switch means being adapted to control predetermined air supply means to the unit, means placing a drive shaft of said motor in operative engagement with the first named means, the thermostat of said one unit being in circuit with the motor to actuate the dual switch means of said one unit in putting the relay device in circuit with the transformer in actuating the first named means of said one unit in controlling discharge of air from the duct in which said one unit is mounted, and said other part of the dual switch means being adapted to control operation of a similar supplemental unit located in the zone in which said one thermostatically controlled unit is arranged.

2. In zone control units as defined in claim 1, wherein said other part of the dual switch means is in circuit with the actuator of said supplemental unit for simultaneous actuation of the supplemental unit when said one thermostatically controlled unit is put into operation.

3. A zone control unit as defined in claim 1, wherein said first named means comprises a plurality of louvers pivotally mounted in said casing, a crank mounted on and driven by the shaft of the motor, and means transmitting operation of the crank to said louvers in movement of said louvers into open and closed positions.

4. In zone control units as defined in claim 2, wherein the two parts of said dual switch means comprise switch plates in each of said units.

5. In zone air conditioning controls, a unit adapted, as an assemblage, to be mounted, in its entirety, in an air circulating duct having a source of air supply, said duct registering with an opening in a support, said unit comprising a casing having means for controlling discharge of air therethrough, an actuator including a motor and dual switch means on a driven shaft of the motor, means projecting from the casing for supporting the actuator in each of two positions, one position for use in a horizontal duct and a second position for use in a vertical duct, means placing said motor shaft in operative engagement with said first named means, said dual switch means and motor being in circuit with a source of electric supply including a transformer relay device and a thermostat, and said thermostat being in circuit with the motor to actuate the dual switch means in putting the relay device in circuit with the transformer in actuating said first named means to control discharge of air from the duct through said casing.

6. A unit as defined in claim 5, wherein the dual switch means comprises a wafer switch comprising two switch plates, and circuit means of one of said switch plates being adapted to place an actuator of a supplemental unit in operation when the actuator of the first named unit is put into operation under the control of the thermostat of said first named unit.

7. A unit as defined in claim 5, wherein the first named means comprises a plurality of louvers pivotally mounted in said casing, a crank mounted on the shaft of the motor, and means transmitting operation of the crank to said louvers in movement of said louvers into open and closed positions.

References Cited by the Examiner

UNITED STATES PATENTS

| 1,343,330 | 6/1920 | Miles | 237—2 |
|---|---|---|---|
| 1,844,841 | 2/1932 | Colman. | |
| 2,157,025 | 5/1939 | Snediker. | |
| 2,274,614 | 2/1942 | Nessell | 236—1 |
| 2,790,372 | 4/1957 | Cooper. | |
| 2,977,437 | 3/1961 | Doane. | |

FOREIGN PATENTS 846,506   8/1960   Great Britain.

ALDEN D. STEWART, *Primary Examiner.*